Aug. 24, 1926.

A. J. OTTO ET AL 1,597,353

SETTING DEVICE FOR TEMPERATURE CONTROL INSTRUMENTS

Filed April 26, 1926   4 Sheets-Sheet 1

Inventors:
Arthur J. Otto
Carl H. Otto,

Dodge and Sons
Attorneys

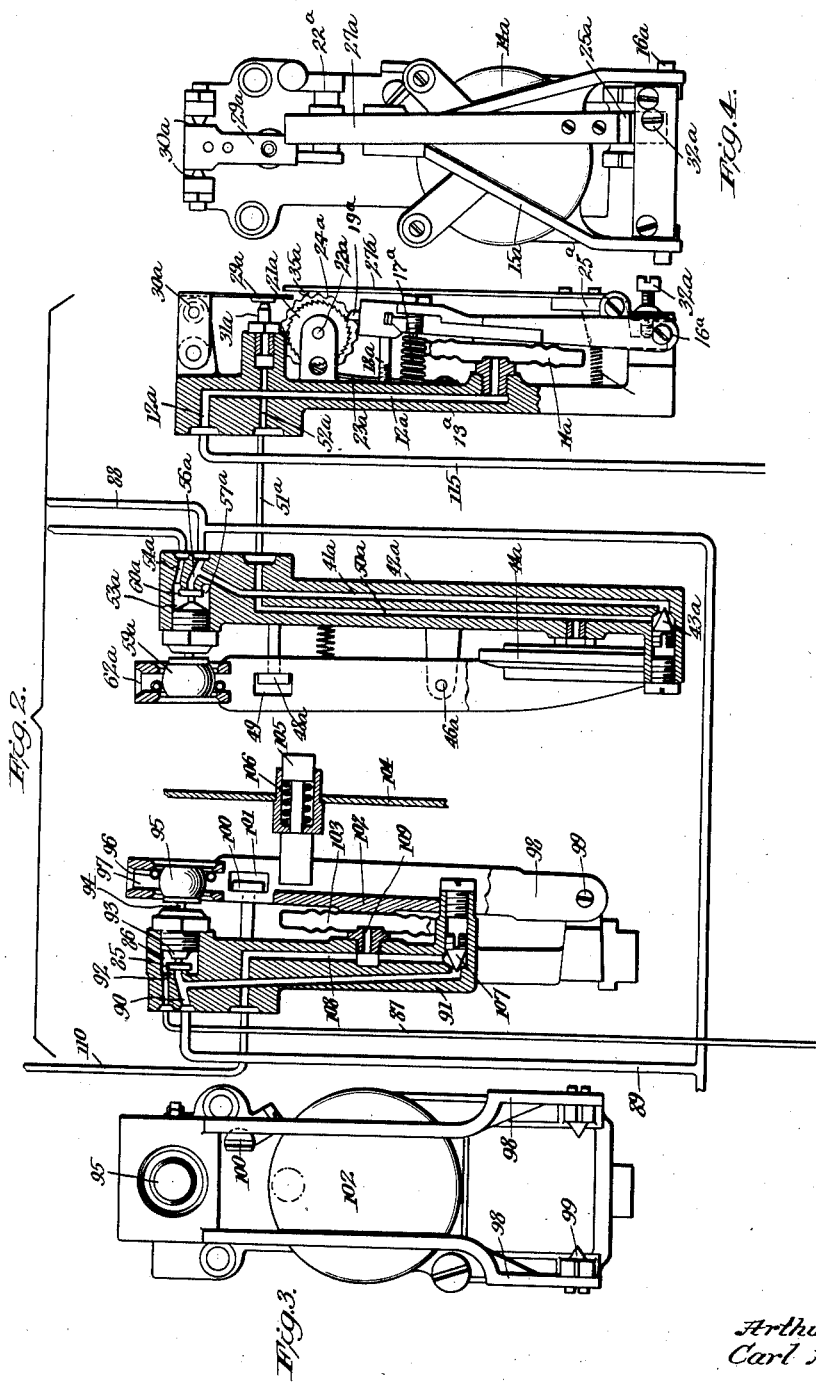

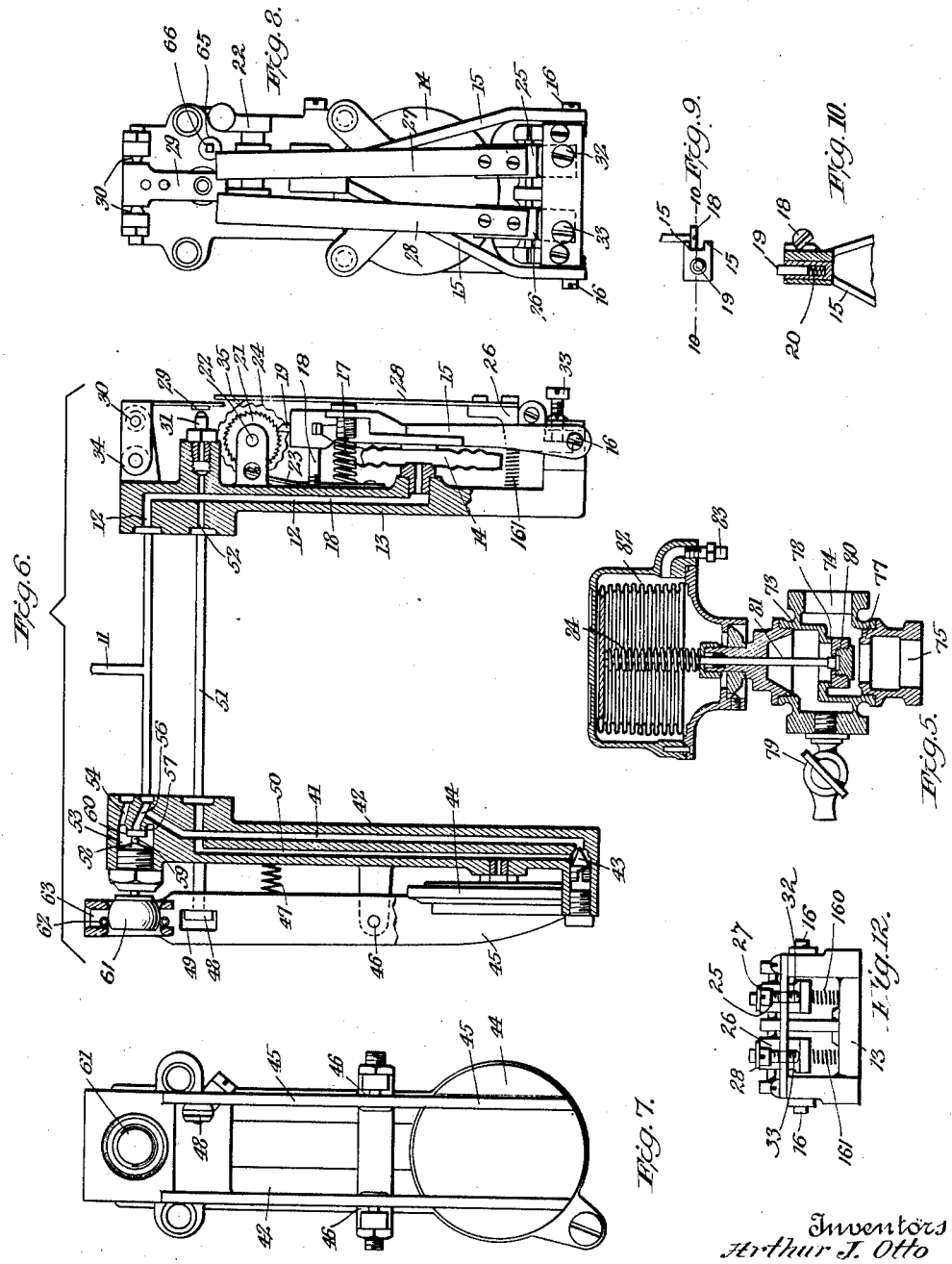

Aug. 24, 1926.

A. J. OTTO ET AL 1,597,353

SETTING DEVICE FOR TEMPERATURE CONTROL INSTRUMENTS

Filed April 26, 1926 4 Sheets-Sheet 4

Inventors:
Arthur J. Otto
Carl A. Otto,
By Dodge
Attorneys

Patented Aug. 24, 1926.

1,597,353

UNITED STATES PATENT OFFICE.

ARTHUR J. OTTO AND CARL A. OTTO, OF MILWAUKEE, WISCONSIN, ASSIGNORS TO JOHNSON SERVICE COMPANY, OF MILWAUKEE, WISCONSIN, A CORPORATION OF WISCONSIN.

SETTING DEVICE FOR TEMPERATURE-CONTROL INSTRUMENTS.

Application filed April 26, 1926. Serial No. 104,754.

This invention relates to temperature regulation and particularly to so-called night and day thermostat systems of the selective control type for large public buildings. The purpose of the selective control is to cause certain selected thermostats to maintain the day temperature at night, notwithstanding the fact that at such time the system as a whole is set to maintain the night temperature.

Systems of this general character are known, and in one such prior system it is the practice to use in each room a pneumatic thermostat controlling the temperature in each such room, and having a motor connected to change the adjustment of such thermostat night and morning through power derived from a wave of abnormal pressure in the pneumatic feed line. This pressure wave operates to advance the motor step by step, and at each actuation the motor shifts the adjusting mechanism of the thermostat in alternately opposite directions to establish two different adjustments. A selector on each thermostat is provided, and usually takes the form of a device which maintains the day setting regardless of the operation of the automatic adjusting means.

The present invention relates to means for producing the wave of abnormal pressure used in a system such as just described to effect morning and evening adjustments of the thermostats. This mechanism may be manually operated, but in order to illustrate the possibility of clock control a system equipped with such a control is shown.

The preferred embodiment of the invention is illustrated in the accompanying drawings, largely in diagram. All the working parts are illustrated in detail, but in order to trace out the air passages without undue multiplication of figures the passages are diagrammatically shown so as to bring them all into one plane, and thus permit them to be shown complete in one sectional view. The exact arrangement of the passages is functionally immaterial, but a more compact arrangement can be secured in practice by a somewhat different arrangement of the passages according to principles well understood in this art. In the drawings—

Figure 2 is an enlarged diagrammatic section of a portion of the control mechanism shown in Figure 1.

Figure 3 is a front elevation of the pressure wave initiating mechanism, which is the left hand one of the three instruments shown in Figure 2.

Figure 4 is a front elevation of the indicator actuator, which is the right hand instrument in Figure 2.

Figure 5 is a vertical section of the three-way diaphragm operated valve, which is the direct means used to produce the pressure wave in the supply pipe.

Figure 6 is a diagrammatic section of the thermostatic equipment used in each room.

Figure 7 is a front elevation of the thermostat relay, which is the left hand instrument of Figure 6.

Figure 8 is a front elevation of the adjustable thermostat, which is the right hand instrument of Figure 6.

Figure 9 is a detail of the stop screw mechanism used in the instrument of Figure 8.

Figure 10 is a section on the line 10—10 of Figure 9.

Figure 12 is an elevation of the lower end of the instrument of Fig. 8.

Figure 1:
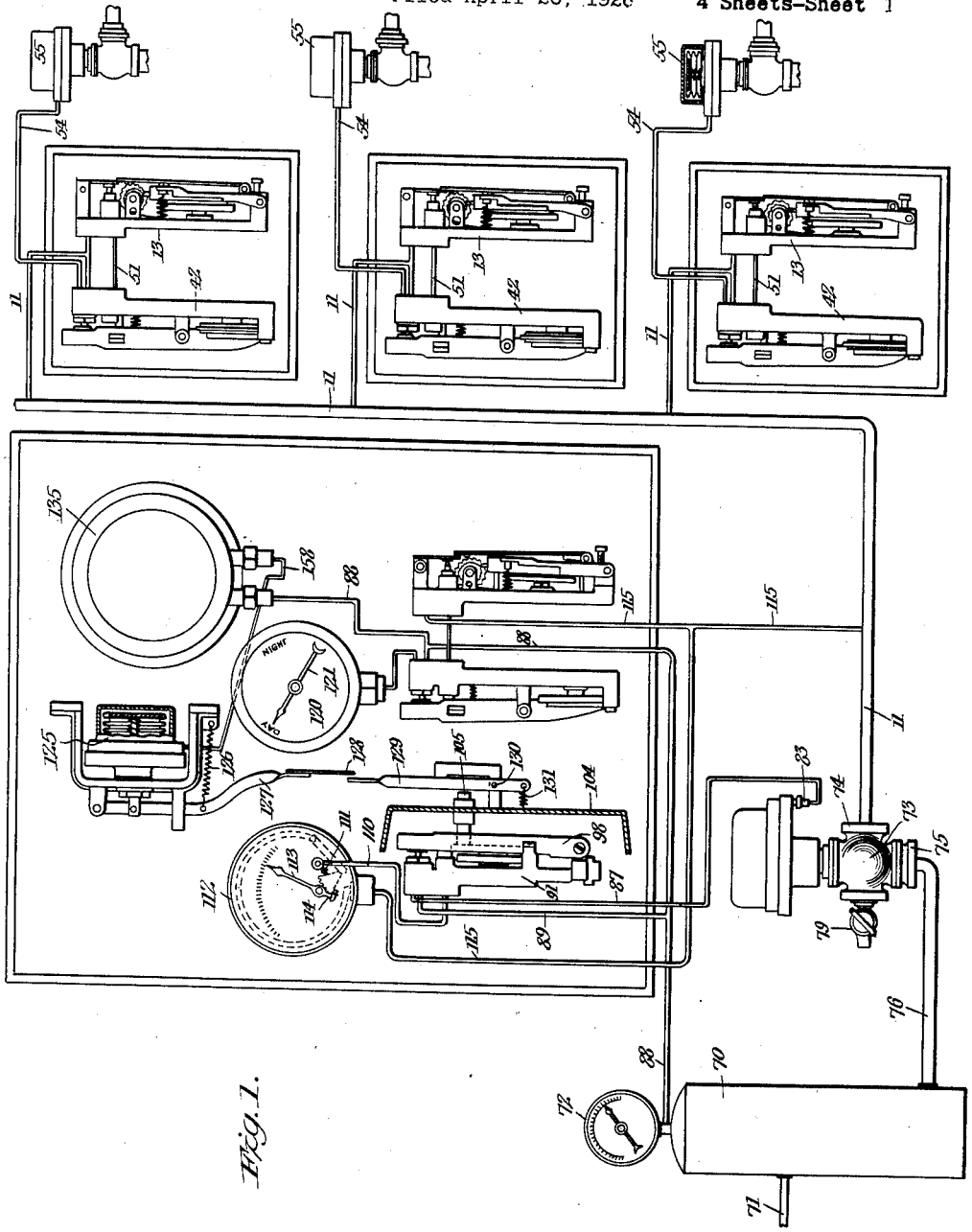
Figure 1 is a diagrammatic elevation of the complete system, including the control and indicating apparatus in the engine room, and the thermostatic instruments for three of the controlled rooms.

The description can be followed more readily if the structure of the thermostat used in each room be first described. This is illustrated in Figures 6, 7 and 8. A supply line 11 brings fluid under pressure to a passage 12 formed in the frame 13 of the thermostat, and this passage leads to an expansible diaphragm chamber 14 of any suitable type. This chamber is in contact with actuator lever 15, which is pivoted at 16 to the lower part of frame 13. The lever 15 is urged inward by a coil spring 17, and its motion is limited by a stop screw 18 (see Figures 9 and 10.) The lever 15 is formed as a triangular yoke in order to secure a long pivot bearing, and it carries in its upper end a pawl 19, which is urged outwardly by a coil spring 20 (see Figure 10). This pawl engages the teeth on a ratchet wheel 21, journaled at 22 on a portion of the frame 13. The stop screw 18 permits slightly more motion than is necessary to enable the pawl 19 over-run one tooth on the ratchet wheel 21, and the wheel 21 is locked against backward rotation by a spring detent 23.

Fixed to the ratchet wheel 21 to turn therewith is a cam wheel 24 having a sinuous contour, the angular interval between the crests and waves on this sinuous contour being exactly equal to the feeding action of the lever 15 and pawl 19 upon one double vibration of the lever. In the case of a single tooth feed such as has been assumed, there would be half as many crests on the cam 24 as there are teeth on the ratchet wheel 21.

Pivotally mounted on the lower portion of the frame 13 are two saddles 25 and 26, each of which carries a corresponding thermostatic bar 27 and 28. The saddles are provided with springs 160, 161 which turn the saddles so as to move the respective thermostatic bars inward toward the frame 13 so as to engage the valve member 29, which is pivoted at 30, and seal this valve member against the end of a leak port 31. Rotation of the saddle 25 is limited and consequently the adjustment of the thermostatic bar 27 is determined by means of an adjusting screw 32. A screw 33 performs a similar function for the saddle 26 and its bar 28. The valve 29 is weighted at 34 so as to tend to swing away from and thus open the leak port 31.

The thermostatic bars 27 and 28 are so arranged that they flex inward on rise of temperature, thus closing valve 29 against the leak port 31. The effect of this, as will later be explained, is to shut off the heat to the room under control of that thermostat. The bar 28 is set to maintain the day temperature. The bar 27 is set to maintain the night temperature, and consequently is so adjusted that when allowed to act it engages the valve 29 at a temperature at which the day bar 28 clears the valve 29.

The sinuous cam 24 underlies the night bar 27 and coacts with a boss 35 on such bar. The parts are so proportioned that whenever a crest on the cam 24 engages the boss 35 the night bar 27 is held forward so that it clears the valve 29. Under such conditions the night bar 27 is inoperative and the day bar 28 will perform the controlling function. One double vibration of the lever 15, however, shifts the cam 24 so that the boss 35 enters the interval between the two crests and this is sufficiently deep to permit the night bar 27 to engage and close the valve 29.

When the full normal pressure is on the system, the diaphragm chamber 14 is distended and the lever 15 is held at its outward limit of motion, as shown in Fig. 6. If the supply pressure is sufficiently lowered, the spring 17 overpowers the diaphragm 14 and draws the lever 15 inward to the limit of its inward motion, such motion rotating the ratchet wheel 21. Upon restoration of pressure the parts are returned to their original position, except detent 23 prevents backward rotation of the ratchet wheel 21 and compels the spring pawl 19 to override and engage the next tooth.

The opening and closing of the leak port 31 operates a relay, shown in the left hand portion of Fig. 6, and in Fig. 7. The supply line 11 leads to a passage 41 in the body 42 of the relay. This passage leads past a throttling needle valve 43 to a diaphragm chamber 44 mounted on the body 42 and arranged to exert thrust against the lower end of a lever 45, which is pivoted at 46 on the body 42. The lever 45 is urged in a direction to collapse the diaphragm 44 by means of a coil spring 47, and the motion of the lever is limited by a stop screw whose head 48 enters an aperture 49 in the lever. The aperture 49 is so dimensioned as to permit the desired range of motion.

From the diaphragm chamber 44 a passage 50 leads by way of pipe 51 and passage 52 to the leak port 31. Valve 43 is adjusted to a capacity less than that of leak port 31.

In the upper end of the relay body 42 is a valve chamber 53. This communicates by a port 54 with a diaphragm chamber of a corresponding radiator valve 55 (see Figure 1), and this radiator valve is so contrived that the valve will close upon the admission of pressure to its diaphragm chamber.

A port 56 leads from passage 41 to a valve seat 57 in chamber 53. Opposed to the seat 57 is a second seat 58 which controls an exhaust port, consisting merely of a clearance around the stem 59 of the valve 60. When against the seat 57 the valve 60 cuts off the pressure supply to the port 54 and vents this port to the atmosphere. When the valve 60 is against the seat 58 the exhaust port is closed and fluid pressure is admitted by way of ports 56 and 54 to the diaphragm motor of the radiator valve 55. Thus the movement of the valve 60 back and forth controls the action of the radiator valve 55. The valve 60 is operated by the lever 45 through a quick throw mechanism of familiar type. This comprises a spherical head 61 and a contractile annular spring 62, which is confined in a slot 63 at the upper end of lever 45. When the upper end of lever 45 moves outward (to the left) the spring 62 acts suddenly to shift the valve 60 to the right, and on reverse movement of the lever 45 it acts suddenly to shift the valve 60 to the left. In the limiting positions of the lever the coil spring 62 exerts substantial seating pressure on the valve. A selector 65 having a flange which underlies bar 27, is threaded into frame 13. It may be screwed outward by means of a key applied to squared head 66 and in such case the flange holds bar 27 in inoperative position.

It will be observed from Figure 6 that the pneumatic relay thremostat illustrated is, generally speaking, well known in the art. The ratchet-fed cam mechanism for effecting the adjustment is a relatively recent development, but is not a part of the present invention and hence is not claimed herein. It is illustrated merely as one type of thermostat capable of adjustment through surges of abnormal pressure in the supply line.

Referring now to Figures 1 to 5 inclusive, the controlling and indicating equipment will be described. 70 is a reservoir to which air is supplied through pipe 71 by any preferred means in such a way as to maintain a substantially constant pressure in the reservoir. 72 is a pressure gage indicating the pressure in the tank 70.

The main supply line 11 for the thermostats previously described is connected to the tank 70 through a three-way valve illustrated in detail in Figure 5. The body 73 is connected at 74 with the pipe 11 and at 75 by way of a pipe 76 (Fig. 1) with the tank 70. Within the body 73 are formed two valve seats, the first of which, 77, leads to the connection 75, and the second of which, 78 leads to a throttling vent cock 79, which discharges to the atmosphere.

In cases where the supply line 11 is long, it is necessary to vent it gradually in order to permit the most distant thermostat to be vented before the automatic apparatus in the engine room responds to the drop in pressure, and acts to restore normal pressure. The function of the cock 79, therefore, is to throttle the escape of air from the line 11 to insure that the pressure drop occurs practically simultaneously throughout the entire length of the supply line 11.

The valve member 80 is guided by a stem 81 and is arranged to seat alternately against the seats 77 and 78. It is actuated by a metallic bellows 82 which is subject to pressure fluid arriving through a connection 83. A spring 84 urges the valve 80 toward its normal position against seat 78. Under such circumstances the reservoir 70 is in direct communication with the supply line 11. When pressure fluid is admitted through the connection 83 the spring 84 is overpowered and valve 80 seats against seat 77, interrupting the connection between the reservoir 70 and the supply line 11, and venting the supply line to the atmosphere through seat 78 and throttling cock 79.

The supply of air to, and its exhaust from, the connection 83 (Figs. 1 and 2) is controlled by a pilot valve 85 mounted in the valve chamber 86, the chamber 86 being connected by a pipe 87 with the connection 83. An auxiliary supply line 88 leads from the reservoir 70, and a branch 89 thereof leads to a passage 90 in the body 91. One branch of the passage 90 leads to a seat 92 in valve chamber 86, against which the valve 85 is normally seated. The valve 85 is capable, however, of being seated in the opposite direction against a seat 93, and when so seated is closes an exhaust port which takes the form of clearance around the stem 94 of valve 85.

The stem 94 carries at its outer end a spherical head 95, forming part of a quick throw mechanism. The head 95 is embraced by a contractile annular spring 96, housed in a slot 97 in a yoke 98, and the parts function to produce the desired quick throw, in a manner already described with reference to Fig. 6.

The yoke 98 is pivoted at 99, and is limited in its movements by the head 100 of a stop screw, which engages the slot 101 in yoke 98. The yoke 98 carries a thrust plate 102, against the rear side of which bears an expansible diaphragm chamber 103, supported on the body 91 of the instrument.

Mounted in the case or cover 104, better shown in Figure 1, is a push button plunger 105 urged outward by a coil spring 106. By pushing on the outer end of the plunger 105, it is possible to move the yoke 98 inward, thus shifting the quick throw mechanism, so that the valve 85 is moved outward and seated against the exhaust seat 93. It then admits pressure fluid through the connection 83, suddenly shifting valve 80 downward against seat 77 to vent the supply line 11. There being no return spring for the yoke 98, it will remain in its inward position until pressure builds up in the diaphragm 103 and restores the parts.

The pressure necessary for this restoration is supplied by the following means: A branch of the passage 90 leads by way of a throttling valve 107 to a passage 108, which is connected by way of nipple 109 to the interior of the diaphragm chamber 103. The passage 108 is connected by a pipe 110 with a leak port 111, mounted in a pressure gage 112 (see Fig. 1). The hand 113 of this gage carries a valve member 114, which in the low reading of the hand closes leak port 111. The gage 112 is connected by a pipe 115 to the supply line 11. The throttling valve 107 is so adjusted as to reduce the rate of flow through passage 108 to a value less than the capacity of the leak port 111.

It follows that so long as there is pressure on the supply line 11 the leak port 111 will be open and will vent the diaphragm chamber 103. Consequently, until the hand 113 moves to its low reading, yoke 98 will remain in its inward position to which it was shifted by the actuation of the push button 105. When the hand 113 reaches the low reading, the valve member 114 closes leak port 111 and pressure builds up in the diaphragm chamber 103, and restores the parts to their normal positions shown in Fig. 2. This immediately vents the diaphragm motor of valve 80 (see Fig. 5) and this valve moves upward, seating against the seat 78. This terminates the venting of the supply line 11, and again admits pressure fluid to that line.

It is desirable to have in the engine room a device which will indicate at any time the setting of the room thermostats then existing. One satisfactory way of accomplishing this result is to make use of an instrument similar to the room thermostats, and actuated by the pressure waves in the supply line, exactly as the room thermostats are actuated. Such an instrument is illustrated particularly in the right hand portion of Figure 2, and in Figure 4, and is similar to the thermostat and relay illustrated in Figues 6, 7 and 8.

To avoid needless repetition of description, there have been applied to the indicating instrument the same reference numerals as were applied to the room thermostat but with the subscript "a". The following differences, however, will be noted. There is in the indicating instrument no element corresponding to the selector 65 nor thermostatic bar 28, which together with the saddle 26 and stop screw 33 would be useless in the indicating instrument and hence are omitted. The member 27ª unlike the member 27, has no thermostatic characteristic but is a simple lever. The relay structures are absolutely identical. The passage 12ª is connected directly to the main supply line 11 by a branch of pipe 115. The diaphragm chamber 14ª is thus subject to changes in the main supply pipe pressure in exactly the same way as is the diaphragm chamber 14 of each room thermostat. A supply passage 41ª and its branch 56ª are connected directly to the secondary supply line 88, and thus receive pressure fluid at all times from the tank 70. The port 54ª is connected to an indicator of the Bourdon gage type, shown at 120 (see Fig. 1).

The indicator 120 and the thermostats are operated step by step in strict phrase relation. Hence hand 121 of gage 120 gives a low pressure indication at day setting and a high pressure indication at night setting. The dial is marked with the legends "Day" and "Night".

In order to actuate the push button 105 automatically by means of a clock, we make use of a diaphragm motor 125, normally held in a retracted position by a spring 126, connected to its motor arm 127. The arm 127 carries a flexible extension 128 which is arranged to engage, shift, and then ride over the end of the lever 129. The lever 129 is pivoted at 130, and is normally retracted by a spring 131. When actuated by the lever 127 it strikes the button 105, and actuates the same.

The motor 125 is subjected to pressure by the clock mechanism 135 hereinafter described for a substantial period of time, while it is desired to depress the button 105 for only a short time. The flexible extension 128 causes the lever 127 to release the lever 129 promptly. On the return movement of the lever 127 it again overrides the end of the lever 129.

Figure 11:
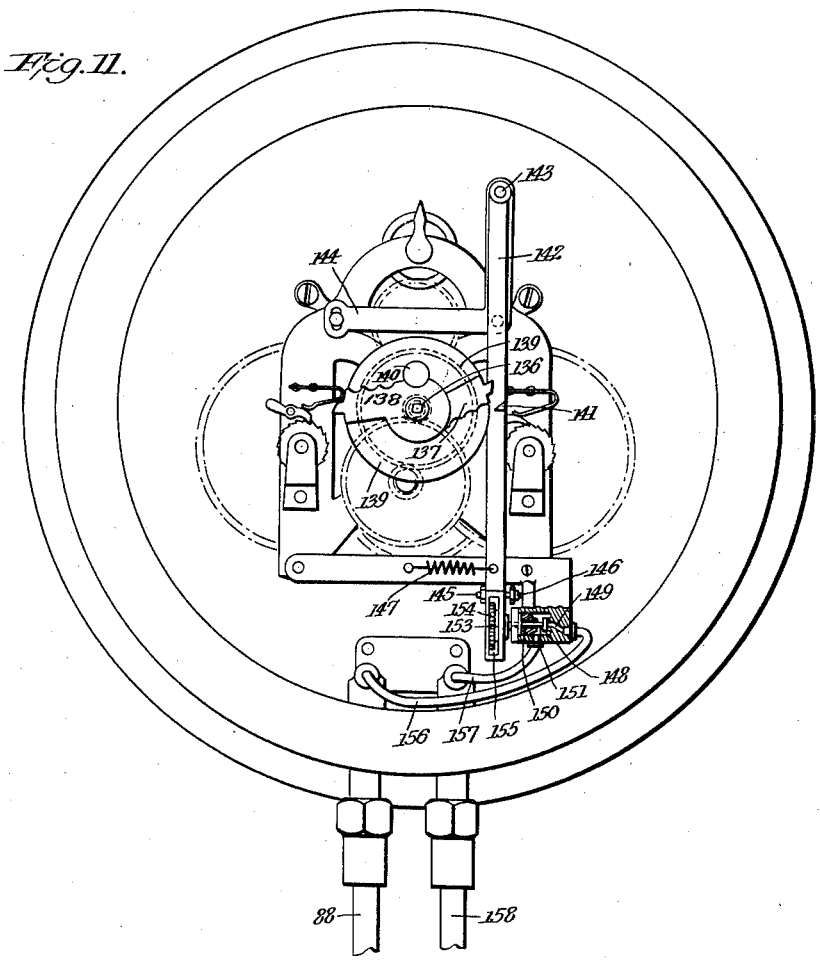
Figure 11 is a front elevation of the controlling clock mechanism.

The clock mechanism 135 is shown in Fig. 11 in some detail. The arbor 136 makes one turn in twenty-four hours and carries two arms 137 and 138, which are independently adjustable angularly relatively to a graduated disk 139 fast on the arbor 136. The adjustment is made by means of a clamp screw 140 which when set up locks both arms to the disk. The arms 138 and 139 are each provided with a beveled end so dimensioned as to engage a lug 141 on a lever 142. The lever 142 is pivoted at 143 on the adjustable bell crank 144, and its range of motion is limited by stop nuts 145 and 146.

The spring 147 urges the lever 142 constantly to the left. Thus twice in each twenty-four hours the lever 142 is forced to the right gradually and then suddenly released. The lever 142 actuates a valve 148 so as to set it alternately to seal a supply port 149, and an exhaust port 150. The exhaust port is formed as a clearance around the stem 151 of the valve, and the connection between the lever 142 and the valve stem 151 takes the form of a quick throw mechanism, including a spherical head 153 on the valve stem 151, and a contractile annular spring 154 housed in a slot 155 on lever 142. Fluid under pressure is brought by the pipe 88 to the clock and is conducted by the tube 156 to the supply port 149. The valve chamber between the supply ports is connected by a tube 157 to pipe 158, which leads to the diaphragm motor 125 already described.

As the lever 142 is moved slowly to the right by the clock, it reaches a point at which the valve 148 is suddenly shifted to the left, admitting pressure fluid to the motor 125, and closing the exhaust from such motor. When the lever 142 is later released and restored by spring 147 the valve 148 is quickly restored to its normal position in which the admission of pressure fluid to the motor 125 is terminated, and the motor is vented to the atmosphere.

The operation of the various parts has been described, and a brief general statement of operation will therefore suffice. The time of automatic operation morning and night is determined by the adjustments of the arms 137 and 138. These adjustments are directly indicated on the graduated disk 139. At the times determined by such adjustment, the lever 142 will be moved to the right, and the motor 125 will be actuated to shift the push button 105. The effect is to shift the yoke 98 which through the action of the valve 85, shifts the three-way valve 80 and vents the main air supply line 11 at a rate determined by the adjustment of the cock 79. This rate is purposely made so slow that when the gage 112 gives the low reading, pressure will have been vented substantially completely from the entire supply line. When this low reading occurs the diaphragm chamber 103 will be distended and will restore the yoke 98. This through the action of the valve 85 returns the valve 80 to its normal position and reservoir 70 again feeds pressure fluid to the supply line 11, until the normal pressure is established.

It follows from the above that pressure in the supply line 11 drops to the low point twice in each twenty-four hours, and after such drop is immediately restored to normal. This change of pressure actuates the diaphragm 14 of each room thermostat to advance the ratchet 21 one tooth, thus shifting or settling the thermostat. At the same time, and for the same reason, the diaphragm 14$^a$ of the indicating device advances the ratchet wheel 21$^a$ one tooth, and causes the indicating gage 120 to shift to show the change from day to night setting or from night to day setting, as the case may be.

What is claimed is:

1. The combination with a temperature control system including a pressure fluid supply line and a plurality of pressure fluid controlling thermostats, each connected with said line and each including means for changing its adjustment operable by a wave of abnormal pressure in said supply line; of valve means operable to initiate a change of pressure in said line; and automatic means responsive to the resulting change of pressure and serving to restore normal pressure in said line.

2. The combination with a temperature control system including a pressure fluid supply line and a plurality of pressure fluid controlling thermostats, each connected with said line and each including means for changing its adjustment operable by a wave of abnormal pressure in said supply line; of valve means operable to initiate a change of pressure in said line; automatic means responsive to the resulting change of pressure and serving to restore normal pressure in said line; and clock-controlled means for actuating said change initiating means.

3. The combination with a temperature control system including a pressure fluid supply line and a plurality of pressure fluid controlling thermostats, each connected with said line and each including means for changing its adjustment operable by a wave of abnormal pressure in said supply line; of a valve operable to cause venting of said line; and automatic means operable by the resulting reduction of pressure and serving to terminate said venting and restore normal pressure in said line.

4. The combination with a temperature control system, including a source of pressure fluid; a pressure fluid supply line connected thereto and a plurality of pressure fluid controlling thermostats each connected with said line and each including means for changing its adjustment operable by a wave of abnormal pressure in said supply line; of a line pressure controlling valve interposed between said source and said line and serving in one position to connect the same and in another position to interrupt such connection and vent the line; a motor for actuating said valve; a control member for said motor having a normal position in which it conditions the motor to maintain said valve in the first named position, but capable of being set in an abnormal position in which it conditions said motor to maintain the valve in the second named position; a second motor arranged to restore said control member to normal position; and means responsive to depletion of pressure in said line and serving to cause said second motor to operate.

5. The combination with a temperature control system, including a source of pressure fluid; a pressure fluid supply line connected thereto and a plurality of pressure fluid controlling thermostats each connected with said line and each including means for changing its adjustment operable by a wave of abnormal pressure in said supply line; of a line pressure controlling valve interposed between said source and said line and serving in one position to connect the same and in another position to interrupt such connection and vent the line; a motor for actuating said valve; an admission and exhaust valve for controlling said motor; a control member having a normal and an abnormal position; a quick throw connection between said control member and said motor controlling valve, the parts being so arranged that in such abnormal position of the control member the line is vented by the line pressure controlling valve; a restoring motor operable to shift said control member to normal position; and means subject to line pressure and rendered effective by the depletion thereof to put said restoring motor into action.

6. The combination with a temperature control system, including a source of pressure fluid; a pressure fluid supply line connected thereto and a plurality of pressure fluid controlling thermostats each connected with said line and each including means for changing its adjustment operable by a wave of abnormal pressure in said supply line; of a line pressure controlling valve interposed between said source and said line and serving in one position to connect the same and in another position to interrupt such connection and vent the line; a motor for actuating said valve; an admission and exhaust valve for controlling said motor; a control member having a normal and an abnormal position; a quick throw connection between said control member and said motor controlling valve, the parts being so arranged that in such abnormal position of the control member the line is vented by the line pressure controlling valve; a restoring motor operable to shift said control member to normal position; means subject to line pressure and rendered effective by the depletion thereof to put said restoring motor into action; a motor arranged to shift said control member to abnormal position; and a clock control for the last named motor.

7. The combination with a temperature control system including a pressure fluid supply line, a plurality of heat controlling motors, and a plurality of thermostat valves each including a thermostatic controlling element with means for changing the action of said element operable by a wave of abnormal pressure in said line, said valves being connected with said line and serving to admit and exhaust pressure fluid to and from said motors; of a pressure responsive indicator; and a valve mechanism connected to said line and controlling the admission and exhaust of pressure to and from said indicator, said device being essentially similar to said thermostatic valves but having a thermally neutral element in lieu of the thermostatic element.

In testimony whereof we have signed our names to this specification.

ARTHUR J. OTTO.
CARL A. OTTO.